Jan. 26, 1960       A. F. OLD ET AL       2,922,490
AIR AND GAS TREATMENT CHAMBER
Filed July 13, 1956
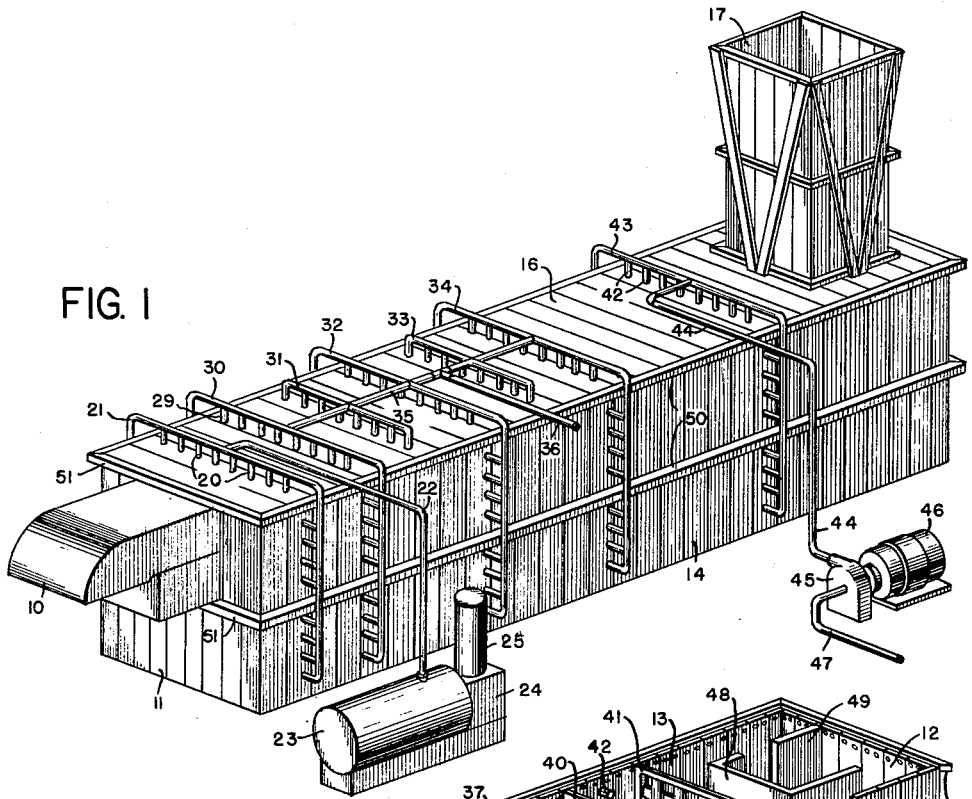
FIG. 1
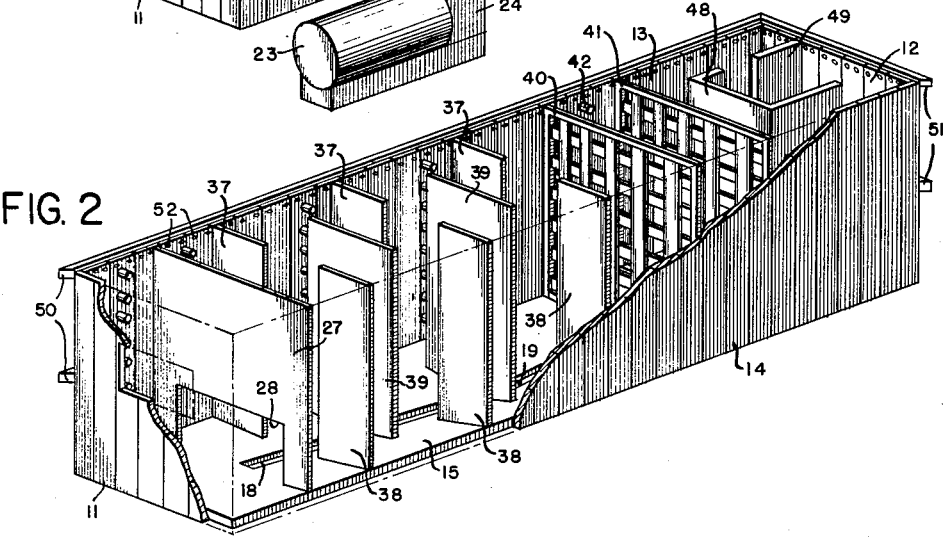
FIG. 2
FIG. 3
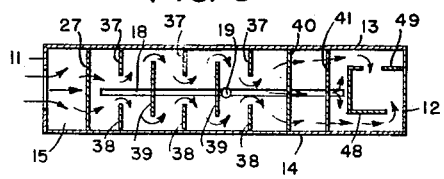
INVENTORS
A. F. OLD
H. E. SEIFERT
BY  *A. Yates Dowell*
ATTORNEYS

United States Patent Office 2,922,490
Patented Jan. 26, 1960

2,922,490

AIR AND GAS TREATMENT CHAMBER

Albert Floyd Old, Bremo Bluff, and Harry E. Seifert, Elmont, Va., assignors to Southern Lightweight Aggregate Corporation, Richmond, Va.

Application July 13, 1956, Serial No. 597,698

1 Claim. (Cl. 183—120)

This invention relates to the treatment of air and other gaseous mixtures components of which, either in gaseous or solid form it is desirable to remove or separate one from another, and particularly those which may be injurious to animal and plant life.

The present invention relates specifically to a device for separating and removing injurious substances from gaseous mixtures, such as those discharged from the smoke stacks of plants of various kinds including those employed in the production of lightweight aggregate, using heat and rotary and other types of kilns in which materials are subjected to high temperatures and with the resultant release of chemical compounds and relatively fine dust particles.

The invention is an improvement over that disclosed in Patent 2,696,274, granted in 1954 and directed to a system for the treatment of air and gas as well as the separation and removal of objectionable components with a chamber having baffles and liquid sprays therein. It has been found possible to improve the operation of the structure disclosed in the patent and to effect a saving in energy, time, and water consumption. This has been accomplished by a change in the baffles, utilizing steam, water under high pressure, and the bringing about of improved relation between certain factors such as temperature, pressure, and treatment of the gaseous mixture.

It is an object of the invention to provide improved means for the treatment of gaseous mixtures by means of which removal or separation of the components can be more efficiently, economically and satisfactorily accomplished.

A further object of the invention is to provide apparatus and a method for removal or separation of gaseous mixtures, and which apparatus includes nozzles for subjecting the mixture to the action of one or more of steam, a series of water spray nozzles for further washing the mixture, a series of baffles to cause impingement of the mixture thereon, and high pressure spray nozzles which provide a further washing curtain through which the gases pass.

Another object of the invention is to provide relatively simple and inexpensive apparatus for treating gaseous mixtures and removing or separating the components thereof by the treatment of the mixture along an extended path with fluid under pressure and temperature conditions which produce maximum intimacy between the fluid and the material treated.

A further object of the invention is to provide apparatus and a method by which a gaseous mixture containing a small amount of moisture can be subjected to heat, as for example from steam, a very substantial amount of moisture, and pressure, and the components removed or separated one from another or from the mixture.

Other objects and advantages of the invention will be apparent from the following description taken in conjunction with the accompanying drawings wherein:

Figure 1 is a perspective of a treating chamber in accordance with the present invention;

Figure 2, a similar perspective with the top and portion of one side of the end wall broken away to reveal the interior; and Figure 3, a diagrammatic view illustrating the path of travel of the gaseous mixture within the treating chamber.

Briefly stated, the present invention comprises a treating chamber into which the gaseous mixture is introduced at one end and after being treated is exhausted from the opposite end. In the treating chamber the gaseous mixture with its solid and chemical components is subjected to high pressure steam and during its travel it comes in contact with a series of baffles arranged to permit maximum flow with minimum restriction, and the impingement of the mixture on the baffles being designed to cause maximum distribution of and intimate contact with the gaseous mixture. The steam may be provided in any desired manner, as for example, by steam generators; and the water pressure may be stepped up in any desired manner, as for example, by a suitable pump.

With continued reference to the drawing, the gaseous mixture to be separated is adapted to be introduced through a duct 10 into the interior of the treatment chamber having front and rear ends 11 and 12, respectively, a pair of sides 13 and 14, a bottom 15, and a top 16 with a discharge outlet or stack 17. The chamber preferably is resistant to heat, acid, and other chemical components, fir lumber having been found satisfactory. The present invention contemplates the use of a base of any appropriate character and a surfacing such as, for example, a base of metal with or without a sheathing or surface coating of plastic or other material bonded thereto. Among the plastic materials particularly suited for present purposes are thermoplastics such as tetrafluorethylene polymers. The surfaces within the chamber may be coated to improve their resistance although the same is not necessary. Also, it has been found that the edges of the lumber may be joined without the necessity of tongues and grooves, as the swelling under the influence of moisture is sufficient to provide a tight joint between the adjacent surfaces.

The bottom 15 is provided with a longitudinal sump or trough 18 and a discharge passage 19 through which discharge of liquid and solid particles from the chamber is accomplished. The bottom is inclined toward the trough 18 so that drainage will result.

In order to remove or separate the components of a gaseous mixture, means is provided for causing flow in a circuitous path and at the same time subjecting the mixture one by one to steam, cold water, and, finally, water under high pressure.

In oder to accomplish this, a series of nozzles 20 are arranged so that they project through the top and side walls of the treating chamber, being supplied by a header 21 from a steam line 22 connected to a steam generating tank 23 heated by suitable means such as a fire box 24 from which products of combustion are discharged through stack 25. When the gaseous mixture enters the treating chamber it may immediately be subjected to steam introduced through nozzles 20 and which contacts solid particles and the chemical components.

After being subjected to steam, the mixture comes in contact with a baffle 27 having an opening 28 in the lower edge portion of the baffle so that it is offset from the inlet in the upper portion of the end wall and causes downward movement of the mixture after it impinges upon the solid portion of the baffle and before it can move lengthwise in the collector chamber.

After the mixture passes through the opening 28 in the baffle 27, it is subjected to a series of washing operations from spray nozzles 29 extending from the headers 30 into the chamber through the top and side walls and supplied with water through headers 30, 31, 32, 33 and 34 from a common supply 35 from a water line 36 connected to a convenient water supply.

Between the nozzles of the headers 30 and 31 are disposed a pair of baffles 37 and 38 located in spaced relation one adjacent each side wall of the chamber, and between the nozzles of the headers 31 and 32 is disposed a central baffle 39. In like manner between the nozzles of the headers 32 and 33 are disposed additional baffles 37 and 38, and between the nozzles of the headers 33 and 34 is disposed an additional central baffle 39, behind which are disposed an additional spaced pair of baffles 37 and 38.

An additional pair of lattice work baffles 40 and 41 are located near the discharge end of the chamber and between them are disposed through the sides and top of the container nozzles 42 supplied with water at high pressure through headers 43 from a line 44 connected with a pump 45 driven by an electric motor 46 or other source of power, water being supplied through a supply line 47. The mixture passing through the chamber is caused to travel in an indirect path around and between the baffles, during which time it may be treated with a liquid spray and a curtain of liquid under high pressure either individually or collectively to effect the final treatment before the treated mixture passes around an angular baffle 48 and a final baffle 49 and is discharged upwardly through the stack 17.

The gaseous mixture entering the treating chamber is cleansed by being subjected to the action of the steam which causes wetting, diffusion, condensation, fall-out, and kindred physical as well as chemical changes. The mixture is further cleaned by the washing effect of the liquid introduced through the sprays and by the effect of the high pressure liquid curtain which serves to remove odor as well as excess moisture whereupon the discharge from the treating chamber is of maximum cleanliness and dryness.

The treating chamber is provided with side and end reinforcing bars 50, 51, which may be held in place by any desired fastener means, for example, bolts 52.

It will be evident that the steam may be applied directly to gas to obtain chemical changes in the gas and the fine dust particles carried by such gas and under some circumstances this treatment may be all that is necessary particularly where the gases are relatively cool and the dust particles will absorb moisture and fall out of the gas.

In other circumstances only the intermediate sprays 30 to 34, inclusive, may be used to remove the objectionable chemical material and dust from the gas, and in still other applications high pressure sprays through nozzles 42 may be the only treatment necessary.

It will be evident that the water used in the intermediate sprays 30 to 34, inclusive, may be under relatively low pressure, while the pressure of water used in the sprays 42 may be in the order of 400 to 600 lbs. per sq. inch, so as to maintain a substantially continuous curtain of liquid spray thereby effectively washing the objectionable materials from the gas.

It will be evident that the various sprays may be used together in various combinations or individually.

It will be obvious to those skilled in the art that various changes may be made in the invention without departing from the spirit and scope thereof and therefore the invention is not limited by that which is illustrated in the drawing and described in the specification, but only as indicated in the appended claim.

What is claimed is:

In a treatment method for separating solid particles from a gaseous mixture, said method including the steps of providing an elongated substantially horizontally disposed treating zone having an inlet and an outlet, diverting gas flow within said treating zone at several points longitudinally spaced between said inlet and outlet for increasing the path of travel of the gaseous mixture moving therebetween, and introducing steam into the treating zone for initially subjecting said gaseous mixture to an increased temperature, the improvement which comprises introducing low pressure water spray into an intermediate portion of said treating zone for washing and diluting the gaseous mixture passing therethrough, and introducing high pressure water spray on the order of 400 to 600 lbs. per square inch into said treating zone downstream of said low pressure water spray for removing excess moisture and noxious odors from said gaseous mixtures, said low pressure water spray and high pressure water spray being directed normally to the longitudinal axis of the treating zone to provide successive transverse curtains of low and high pressure water sprays through which the gaseous mixture must pass.

References Cited in the file of this patent
UNITED STATES PATENTS

| | | |
|---|---|---|
| 1,112,860 | Smith | Oct. 6, 1914 |
| 1,232,865 | Stevens | July 10, 1917 |
| 1,563,125 | Ward | Nov. 24, 1925 |
| 2,186,125 | Roberts | Jan. 9, 1940 |
| 2,541,027 | Bradley | Feb. 13, 1951 |
| 2,567,162 | Sanders | Sept. 4, 1951 |
| 2,696,274 | Old | Dec. 7, 1954 |